Jan. 14, 1969     H. H. FRANK     3,422,296

INTERLOCK REVERSING SWITCH

Filed Jan. 3, 1967

INVENTOR.
Heinrich H. Frank
BY J. V. Douglas
his atty

United States Patent Office 3,422,296
Patented Jan. 14, 1969

3,422,296
INTERLOCK REVERSING SWITCH
Heinrich H. Frank, Amherst, Ohio, assignor to Emerson
Electric Co., St. Louis, Mo., a corporation of Missouri
Filed Jan. 3, 1967, Ser. No. 606,773
U.S. Cl. 310—68                                 11 Claims
Int. Cl. H02k 11/00; H01h 9/20; H01h 33/46

ABSTRACT OF THE DISCLOSURE

A switch mechanism is provided for a power drive where a reversible motor is disposed in a housing and a carrying handle extends in spaced relation above the housing. Inside the handle is a main switch that opens and closes the main circuit to the motor. The switch is operated by a trigger extending through and below the handle. Alongside the main switch is a reversing switch having a toggle lever for operating it. This switch is connected to the motor circuit to enable it to be reversed. Above and on the handle is a selector handle which operates a selector member having a first part mechanically connected to the reversing switch. A second part of the selector member is disposed to cooperate with the trigger to prevent the trigger being operated when the selector is in a mid-position and to prevent the selector from being operated when the trigger is on and the motor operating.

---

This invention relates generally to switches for reversing motors.

A switching means for a portable motor driven tool wherein a main switch is disposed in a carrying handle and a trigger control therefor under it. A reversing switch is disposed near the main switch and a control for the reversing switch has an operator above the handle and a portion extending down and connected to the reversing switch and another portion extending in cooperative relation with the trigger means whereby the trigger means cannot be operated when the reversing switch is in neutral and the reversing switch cannot be operated when the trigger switch is in the "on" position.

Many hand-held tools use motors that are required to be operated in both forward and reverse directions and such motors are provided with conventional on-off switches and conventional small size, low amperage reversing switches. In many cases the nature of the operation of the motor or the physical arrangement of the parts of the controls of the motor makes it unlikely that the reversing switch will be thrown while the motor is energized. However, many motor operated devices are operated in such a way and the controls are so arranged that there is a possibility of the operator attempting to throw the reversing switch while the motor is energized. If the reversing switch is thrown while the motor is energized, there is a possibility of damage to the reversing switch and to the motor or overloading of the line and hence operation of the reversing switch must be prevented while the motor is energized. One specific example of such a use of a reversing motor where the possibility of the reversing switch being actuated is present, is in hand-held motor operated pipe threading tools, and will be described in conjunction with such a tool; it will be apparent, however, that the switch is useful in conjunction with other motor driven tools such as electric drills and other devices. The motor is energized in one direction or the other to cut either right or left-hand threads and immediately upon the completion of the thread cutting, the motor is reversed to withdraw the pipe from the threading die. A natural tendency of an operator of such a device is to actuate the reversing switch at the completion of the threading operation without first turning off the motor. This is particularly likely to be the case if the on-off trigger switch is provided with a latching mechanism to retain the trigger in the "on" position. If the reversing switch is so actuated with the motor under load, serious damage can be done to the switch and/or the motor. This is just one illustration of a device in which such reversing must be prevented while the motor is energized.

According to the present invention a safety interlock device is provided which prevents the movement of the reversing switch of a motor when the on-off switch is in the "on" position. Preferably the selector knob of the reversing switch operates a projecting arm which abuts the trigger or other actuator of the on-off switch when the trigger is in the "on" position, physically preventing the movement of the selector knob and hence preventing the changing of the reversing switch when the trigger of the on-off switch is in the "on" position. The projecting arm is free to move past the trigger of the on-off switch when the trigger is in the "off" position, thereby permitting changing of the reversing switch when the motor is off.

Another feature of the invention resides in the fact that the position of the reversing switch is visible to the operator at all times and guard means is provided to prevent accidental movement thereof.

Another feature of the invention is the provision of coacting stop means between the arm actuated by the selector knob and the trigger of the on-off switch to prevent movement of the on-off switch to the "on" position when the reversing switch is situated in a neutral position between the forward and reverse positions. This insures that before the motor can be energized, the reversing switch must be positively in either the forward or the reverse position.

Still other advantages of the invention, and the invention itself, will become more apparent from the following description of an embodiment thereof, which is illustrated by the accompanying drawings, and forms a part of this specification.

Briefly, the present invention provides a safety interlock device for a reversible motor having a trigger actuated on-off switch. The device includes a projection or arm formed as a part of the operating knob for the reversing switch, which arm will strike one side or the other of the trigger actuator if an attempt is made to move the knob of the reversing switch when the trigger is squeezed to the "on" position but which projection will freely move past the plane of the trigger when it is in the "off" position, allowing the reversing switch to be reversed. The projecting arm also has a lower stop surface which will engage the top of the trigger actuator when the selector knob for the reversing switch is in its neutral position between the forward and reverse positions of the reversing switch and thus prevent squeezing the trigger when the reversing switch is not in one of its switched positions.

Figure 1:
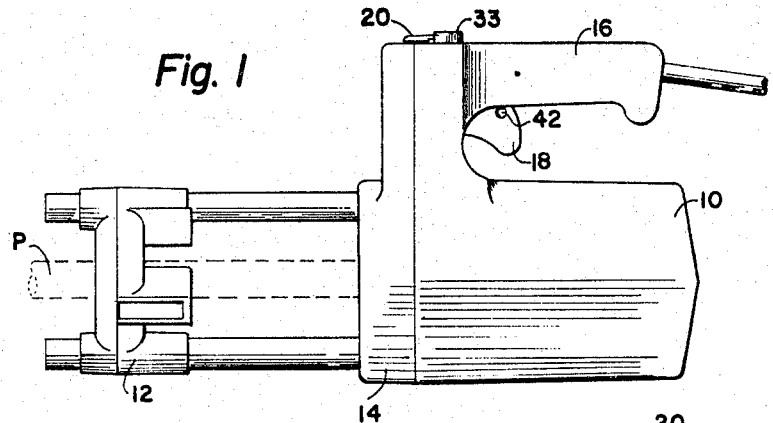
FIGURE 1 is a side elevational view of a pipe threading tool incorporating the safety interlock device of this invention.

More specifically and referring to the drawing, FIGURE 1 shows a typical application of the safety interlock device of the present invention in a hand-operated pipe threading tool. The threading tool has a body 10 which mounts a work support head 12 outwardly therefrom, and a threading die head 14 adjacent thereto. An electric motor (not shown but indicated diagrammatically in FIGURE 3) is provided in the body 10 and is disposed to rotate the threading dies and advance the support head 12 (through appropriate mechanisms not shown) for cutting threads on pipe P, shown in broken outline. Application Ser. No. 544,796, filed Apr. 25, 1966, entitled "Drive Release For Power Tool" discloses such a device for pipe threading tools. The body 10 is provided with a handle 16 mounting a trigger actuator 18 and a selector knob 20 for operating respectively on-off and reversing switches shown in detail in FIGURES 2 through 5.

Figure 2:
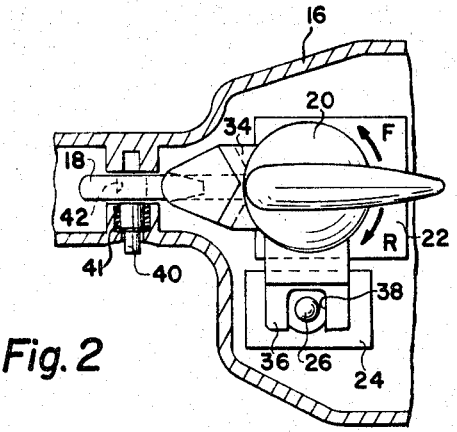
FIGURE 2 is a plan view, partially in section, showing the safety interlock device of this invention.
Figure 3:
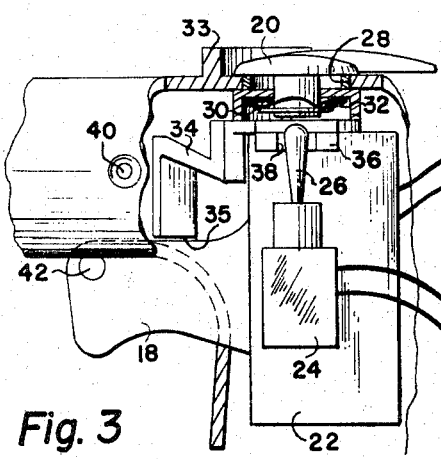
FIGURE 3 is a side elevational detail view, partially in section, of the interlock device of this invention with the reversing switch in a neutral position and the on-off switch in the "off" position.
Figure 4:
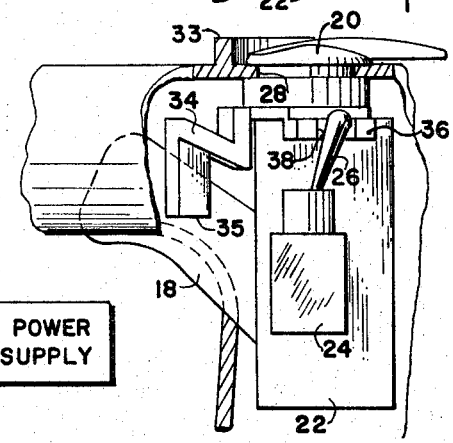
FIGURE 4 is a view similar to FIGURE 3, with the reversing switch in the forward position and the on-off switch in the "on" position.

Referring now to FIGURES 2 through 5, an on-off switch 22 is mounted inside of the handle 16 and is connected to a power supply, as shown diagrammatically in FIGURE 3. The on-off switch 22 is actuated by the trigger 18 which projects through a slot, unnumbered, in the handle 16 and is adapted to be squeezed to move the switch 22 to the "on" position. When the trigger 18 is squeezed and raised, as shown in FIGURE 4, the switch 22 will be turned to the "on" position and when the trigger 18 is released it will return to the position shown in FIGURE 3, which is the "off" position. The trigger 18 is normally biased to the off position by appropriate spring means (not shown) in the switch 22. Electrical power is supplied from the power supply to the on-off switch 22 and thence through a conventional toggle reversing switch 24 to a motor shown diagrammatically in FIGURE 3.

The reversing switch 24 has a toggle lever 26 which is actuated, in a manner to be described, by the selector knob 20 mounted in the handle 16. The selector knob 20 is secured within an aperture 28 on the top of the handle 16 by means of a snap ring 30 and a loading spring 32. The snap ring and loading spring arrangement allows the knob 20 to be freely rotated but provides sufficient frictional resistance to the rotation to ensure a snug fit of the knob 20 with respect to the handle 16. The selector knob 20 is spaced away from the trigger 18 and situated so that it extends through the housing to be visible on top of the handle so the operator can tell at a glance whether the motor is in the forward position, the reverse position, or the neutral position. A raised semi-circular guard 33 is formed on top of the handle 16 which prevents accidental moving of the knob 20.

The selector knob 20 includes a forwardly projecting generally Z-shaped arm 34 which has a lower stop surface 35 which stop surface lies generally above the trigger 18, when the trigger is in the "off" position and the selector knob 20 is in the neutral position as shown in FIGURES 2 and 3. The selector knob 20 also includes a laterally projecting arm 36 which has formed in the end thereof a slot 38 which engages the toggle lever 26 of the reversing switch 24. When the selector knob 20 is rotated clockwise from the neutral position shown in FIGURE 2, it will actuate the toggle lever 26 to the position shown in FIGURE 5, corresponding to the reverse position, and when the selector knob 20 is rotated in a counterclockwise direction from the position shown in FIGURE 2 it will actuate the toggle lever to the position shown in FIGURE 4, constituting the forward position of the switch 24.

Figure 5:
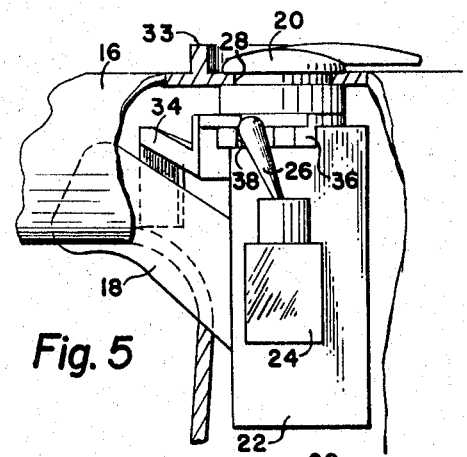
FIGURE 5 is a view similar to FIGURE 4, with the reversing switch in the reverse position.

When the selector knob 20 is in the position shown in FIGURES 2 and 3, the lower surface 35 of the arm 34 is positioned directly above the top surface of the trigger 18 and if an attempt is made to squeeze the trigger 18 its upper surface will strike the lower surface 35 of the arm 34, thus preventing the trigger from being squeezed. Hence, when the selector knob is in the neutral position shown in FIGURES 2 and 3, the trigger 18 cannot be squeezed to actuate the switch 22. However, if the selector knob 20 is switched to either the forward or reverse position from this neutral position, the lower surface 35 of the arm 34 will be rotated out of the path of travel of the trigger 18 and the trigger can be squeezed as shown in FIGURES 4 and 5 to the "on" position. When the trigger 18 is in the "on" position, the arm 34 will be positioned laterally adjacent to one side of the trigger or the other depending upon whether the reversing switch is in the forward or reverse position. If an attempt is made to switch the selector knob 20 from either the forward to reverse position or from the reverse to the forward position when the trigger is squeezed in the "on" position, one side surface of the arm 34 will strike one side surface of the trigger 18, preventing any movement of the selector knob 20 and thus preventing the actuation of the toggle lever 26. Hence, the coaction of the arm 34 and the trigger 18 provides an interlock safety device which will prevent the motor from being switched from the forward to the reverse direction or from the reverse to the forward direction when the trigger is operated to energize the motor. The arm 34 will also act as a safety interlock device to prevent the trigger from turning on the switch 22 when the reversing switch 24 is in the neutral position, due to the coaction of the top surface of the trigger and stop surface 35 of the arm 34.

A latching mechanism for latching the trigger 18 in the "on" position preferably is provided. This mechanism takes the form of a shouldered pin 40, shown in FIGURE 2, normally biased downwardly (as viewed in FIGURE 2) by a spring 41. The pin 40 can be pressed into a hole in 42 in the trigger 18 when the trigger is squeezed and the hole aligned. When the pin 40 is in the hole 42 the force exerted by the spring urging the trigger toward its "off" position is greater than the force of the spring 41, so that the trigger will be held in the "on" position. To release it the pressure is relieved from the pin 40 by squeezing the trigger slightly, which will allow the pin to be moved out of the hole 42 by spring 41. The interlock device is especially desirable in combination with such a trigger latching device since it is quite easy for an operator to try to reverse the motor while the trigger is being held in the "on" position.

Although one embodiment of this invention has been shown and described, various adaptations and modifications may be made without departing from the scope of the appended claims.

I claim:
1. A safety interlock device for a reversing meter comprising, a power switch having a motor-on position and a motor-off position, actuator means disposed to move said power switch between its motor-on position and its motor-off position, a motor reversing switch having a motor-forward position and a motor-reverse position, independent selector means operably connected to said reversing switch disposed to selectively move said reversing switch between its said positions, said actuator means and said selector means having coacting step means positioned to prevent said selector means from operating said reversing switch when the actuator has the power switch in its motor-on position and to permit said selector means to operate said reversing switch when the actuator has the power switch in its motor-off position, whereby reversal of the motor is prevented when the motor is energized.

2. The device of claim 1, wherein said actuator includes stop surface means movable therewith, and said selector means includes a projection movable therewith disposed to abut said stop surface means when the actuator has the switch in its motor-on position and thereby prevent movement of said selector when the motor is energized.

3. The device of claim 2, wherein said stop surface means are defined by a portion of said actuator, and wherein said portion is movable into the path of said projection when the actuator is in the motor-on position and out of the path of said projection when the actuator is in the motor-off position.

4. The device of claim 3, wherein said projection of said selector includes stop means positioned to abut said actuator and prevent movement thereof from the motor-off position to the motor-on position when selector is between the motor-forward position and the motor-reverse position.

5. The device of claim 3, wherein said projection overlies the actuator when the actuator is in the motor-off position.

6. The device of claim 1 further characterized by means normally biasing said actuator to the motor-off position.

7. The device of claim 1 wherein the selector means is spaced from the actuator means and the position determined by said selector means is clearly visible to an operator.

8. In a power tool having a motor housing with a motor therein, the improvement which comprises, a handle secured to said housing and having a portion in spaced relationship thereabove, a trigger actuator carried by said handle on the underside thereof and projecting therethrough, said trigger disposed to operate an on-off switch disposed in said handle which is normally urged to the "off" position, a reversing switch mounted adjacent said on-off switch and arranged to reverse the direction of rotation of said motor, independent rotatable selector means disposed on top of said handle and having a portion projecting therethrough, said selector means having means operably engaging said reversing switch disposed to operate said switch responsive to rotation thereof, said selector means and said trigger having coacting stop surfaces disposed to prevent relative movement of said selector means when said trigger is in the "on" position and permit rotative movement of said selector means when the trigger is in the "off" position.

9. The combination of claim 8, wherein said stop surface on said selector means is defined by a depending member disposed to pass over the top of said trigger when the trigger is in the "off" position.

10. The combination of claim 8 further characterized by guard means formed on said handle at least partially surrounding said rotatable selector means.

11. The combination of claim 8, wherein said reversing switch is a toggle switch having forward neutral and reverse positions.

References Cited

UNITED STATES PATENTS

| 3,086,090 | 4/1963 | Carroll | 200—5 |
| 2,744,176 | 5/1956 | Kaman | 310—50 XR |
| 2,764,705 | 9/1956 | Albertson et al. | 310—68.1 |
| 3,260,827 | 7/1966 | Frenzel | 200—157 |

LEWIS H. MYERS, *Primary Examiner.*

J. R. SCOTT, *Assistant Examiner.*

U.S. Cl. X.R.

200—50, 157